United States Patent
Dick, Jr. et al.

(10) Patent No.: US 6,588,838 B1
(45) Date of Patent: Jul. 8, 2003

(54) REINFORCED SEAT COVER

(75) Inventors: Walt Dick, Jr., West Bloomfield; Steven E. Peck, Highland; Kurt W. Dettloff, Macomb, all of MI (US); John F. Whitaker, Joensboro, GA (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/533,300

(22) Filed: Mar. 23, 2000

(51) Int. Cl.⁷ .................................................. B60N 2/42
(52) U.S. Cl. .............................. 297/216.13; 297/218.2; 297/216.1; 280/730.2; 280/730.1
(58) Field of Search ........................ 297/219.1, 216.13, 297/216.1, 218.1, 218.2; 280/730, 730.2

(56) References Cited

U.S. PATENT DOCUMENTS

| | | | |
|---|---|---|---|
| 4,740,035 A | * 4/1988 | Kazaoka et al. ..... 297/218.1 X |
| 4,768,830 A | 9/1988 | Musselwhite |
| 5,054,845 A | 10/1991 | Vogel |
| 5,498,030 A | 3/1996 | Hill et al. ............ 280/730.2 X |
| 5,499,840 A | 3/1996 | Nakano ................ 280/730.2 X |
| 5,505,487 A | 4/1996 | Brown et al. ............. 280/730.1 |
| 5,511,821 A | 4/1996 | Meyer et al. |
| 5,540,460 A | 7/1996 | Wipasuramonton ...... 280/730.1 |
| 5,542,696 A | 8/1996 | Steffens, Jr. et al. ..... 280/730.2 |
| 5,547,214 A | 8/1996 | Zimmerman, II et al. ............... 280/730.2 X |
| 5,553,887 A | 9/1996 | Karlow et al. ............. 280/730.2 |
| 5,556,127 A | 9/1996 | Hurford et al. ........... 280/730.2 |
| 5,564,736 A | 10/1996 | Kim ........................ 280/730.2 |
| 5,564,739 A | 10/1996 | Davidson ............. 280/730.2 X |
| 5,570,900 A | 11/1996 | Brown ................. 280/730.2 X |
| 5,588,671 A | 12/1996 | Boumarafi et al. ....... 280/730.2 |
| 5,601,332 A | 2/1997 | Schultz et al. .......... 297/216.13 |
| 5,630,615 A | 5/1997 | Miesik .................... 280/730.2 |
| 5,645,295 A | 7/1997 | White, Jr. et al. ......... 280/730.2 |
| 5,669,661 A | 9/1997 | Pajon ..................... 297/216.13 |
| 5,669,662 A | 9/1997 | Maly ...................... 297/216.13 |
| 5,816,610 A | * 10/1998 | Higashiura et al. . 297/216.13 X |
| 5,826,939 A | * 10/1998 | Beyer .................. 297/216.1 X |
| 5,860,673 A | * 1/1999 | Hasegawa et al. .. 297/216.13 X |
| 5,893,579 A | * 4/1999 | Kimuar et al. ...... 297/216.13 X |
| 5,938,232 A | 8/1999 | Kalandek et al. ......... 280/738.2 |
| 5,967,603 A | 10/1999 | Genders et al. ........ 297/216.13 |
| 6,003,938 A | 12/1999 | Lachat et al. .......... 297/216.13 |
| 6,003,939 A | * 12/1999 | Nakai et al. ........... 297/216.13 |
| 6,045,151 A | * 4/2000 | Wu .................... 297/216.13 X |
| 6,074,003 A | * 6/2000 | Umezawa et al. ....... 297/216.1 |
| 6,095,602 A | * 8/2000 | Umezawa et al. .. 297/216.13 X |
| 6,213,550 B1 | * 4/2001 | Yoshida et al. ........ 297/216.13 |

* cited by examiner

Primary Examiner—Peter M. Cuomo
Assistant Examiner—Rodney B. White
(74) Attorney, Agent, or Firm—Brooks & Kushman P.C.

(57) ABSTRACT

A trim cover for use with a vehicle seat having an air bag includes an outer layer. The outer layer includes a front portion having first and second ends. The outer layer further includes first and second bolster portions connected to the first and second ends, respectively, and an intermediate portion connected to the first and second bolster portions at first and second bolster seams, respectively. The first bolster seam is configured to rupture upon deployment of the air bag. A first reinforcement panel is positioned adjacent the first bolster portion. The first reinforcement panel has a first end portion connected to the outer layer proximate the first end of the front portion, and a second end portion connected to the outer layer proximate the first bolster seam. A second reinforcement panel is positioned adjacent the intermediate portion. The second reinforcement panel has one end portion connected to the outer layer proximate the first bolster seam, and an opposite end portion connected to the outer layer proximate the second bolster seam. The reinforcement panels are configured to reinforce the outer layer during deployment of the air bag so that the air bag deploys through the first bolster seam.

25 Claims, 4 Drawing Sheets

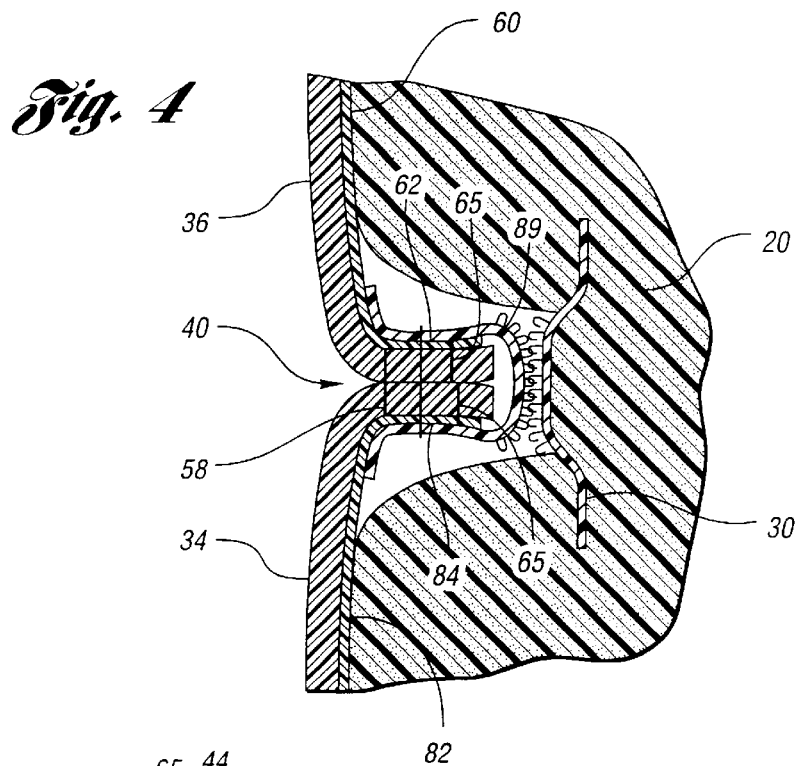
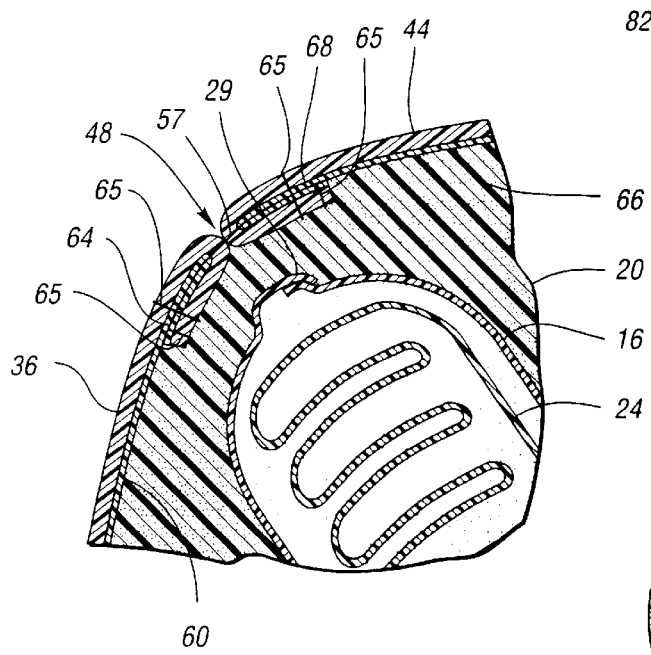
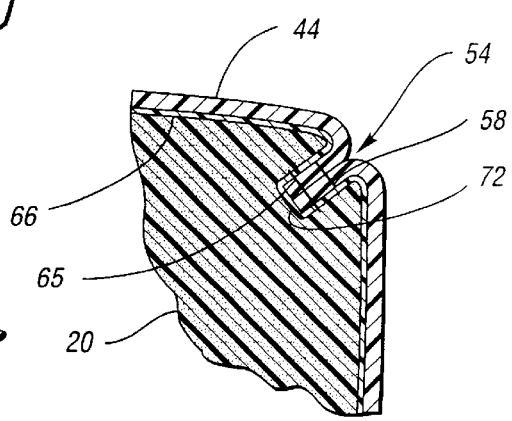

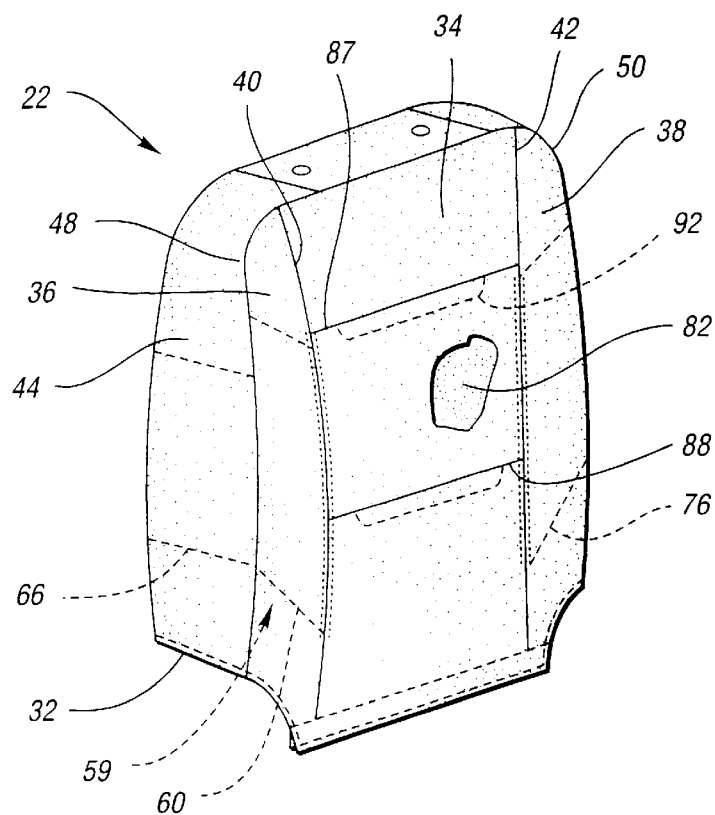
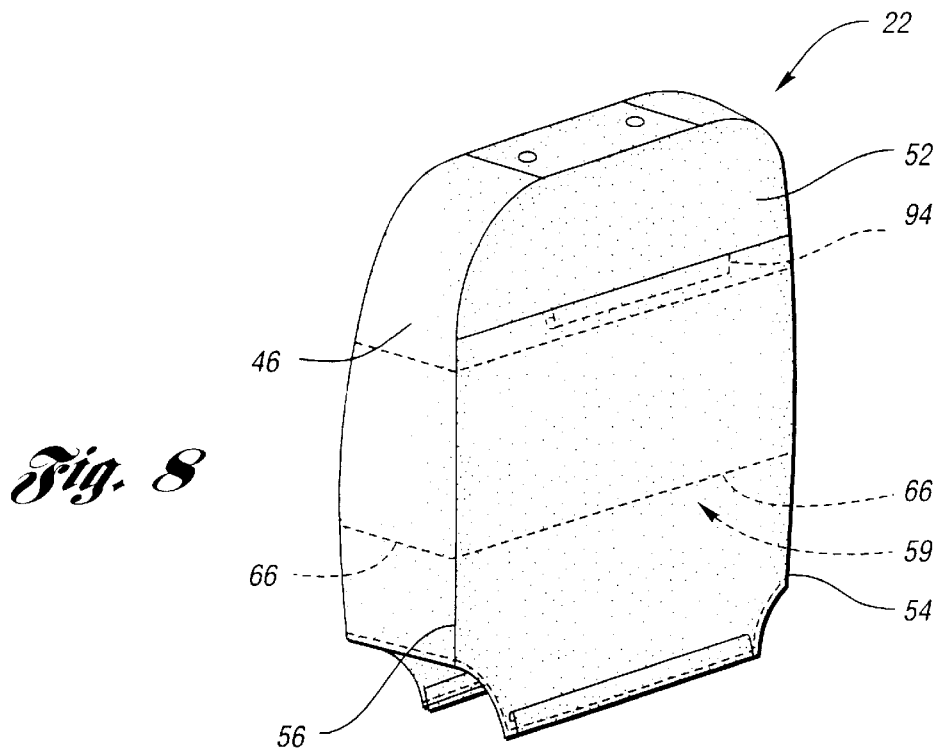

REINFORCED SEAT COVER

TECHNICAL FIELD

The invention relates to a trim cover for use with a vehicle seat having an air bag, wherein the trim cover includes an outer layer and a reinforcement assembly connected to the outer layer.

BACKGROUND ART

Recently, vehicle seats have been provided with integrated air bag systems. One known vehicle seat includes an air bag module mounted to a frame, and a chute surrounding the air bag module. The chute has opposite ends that are connected to a cover material, and a zipper that is used to close the chute around the air bag module. Because the chute must be closed around the air bag module after the cover material has been mounted to the seat, the cover material is typically manually mounted to the seat so that access may be provided to the chute. Such a process is inefficient and significantly increases manufacturing costs.

U.S. Pat. No. 6,003,938 discloses another vehicle seat having an air bag mounted thereto. The seat has a cover including front, rear and side panels. A reinforcement panel is secured to the side panel for localizing stress in the side panel during deployment of the air bag. Because no reinforcement is provided for either the front panel or the rear panel, the cover may tear at undesired locations and/or balloon during deployment of the air bag.

DISCLOSURE OF INVENTION

The invention addresses the shortcomings of the prior art by providing a trim cover for use with a vehicle seat having an air bag, wherein the trim cover includes an outer layer and at least two reinforcement panels connected to the outer layer for reinforcing bolster, side and rear portions of the outer layer. Furthermore, the trim cover may be easily and efficiently mounted to the seat using a roller stuffer.

Under the invention, a trim cover, for use with a vehicle seat having an air bag, comprises an outer layer including a front portion having first and second ends. The outer layer further includes first and second bolster portions connected to the first and second ends, respectively, and an intermediate portion connected to the first and second bolster portions at first and second bolster seams, respectively. The first bolster seam is configured to rupture upon deployment of the air bag. A first reinforcement panel is positioned adjacent the first bolster portion. The first reinforcement panel has a first end portion connected to the outer layer proximate the first end of the front portion, and a second end portion connected to the outer layer proximate the first bolster seam. A second reinforcement panel is positioned adjacent the intermediate portion. The second reinforcement panel has one end portion connected to the outer layer proximate the first bolster seam, and an opposite end portion connected to the outer layer proximate the second bolster seam. The reinforcement panels are configured to reinforce the outer layer during deployment of the air bag so that the air bag deploys through the first bolster seam.

The reinforcement panels are preferably sufficiently flexible so that the reinforcement panels move or flex with the outer layer. While the reinforcement panels may comprise any suitable material, each reinforcement panel is preferably made of nylon.

Because the first bolster portion will likely experience the greatest amount of force during deployment of the air bag, the first reinforcement panel may extend longitudinally beyond the second reinforcement panel.

The intermediate portion of the outer layer may include first and second side portions connected to the first and second bolster portions, respectively, at the first and second bolster seams, respectively. The intermediate portion may also include a back portion connected to the first and second side portions at first and second back seams, respectively. Furthermore, the second reinforcement panel preferably has first and second intermediate sections connected to the outer layer proximate the first and second back seams, respectively.

Preferably, the trim cover also includes a third reinforcement panel positioned adjacent the second bolster portion. The third reinforcement panel may have a first end portion connected to the outer layer proximate the second end of the front portion, and a second end portion connected to the outer layer proximate the second bolster seam. Moreover, the second bolster seam may also be configured to be rupturable. With such a configuration, the trim cover may be used with a seat having an air bag mounted on either side of the seat.

The first and second bolster portions are preferably connected to the front portion at first and second front seams, respectively. Furthermore, the first end portion of the first reinforcement panel is preferably connected to the outer layer proximate the first font seam, and the first end portion of the third reinforcement panel is connected to the outer layer proximate the second front seam.

The trim cover also preferably includes first and second fastening strips connected to the outer layer proximate the first and second front seams, respectively. The first end portion of the first reinforcement panel is preferably sandwiched between the outer layer and the first fastening strip, and the first end portion of the third reinforcement panel is preferably sandwiched between the outer layer and the second fastening strip. These fastening strips provide additional reinforcement to the front seams, and are also engageable with the vehicle seat for securing the trim cover to the vehicle seat.

The trim cover may also be provided with a fourth reinforcement panel positioned adjacent the front portion of the outer layer for reinforcing the front portion during deployment of the air bag.

Further under the invention, a vehicle seat assembly includes a frame and an air bag connected to the frame. A trim cover surrounds the frame and the air bag, and includes an outer layer having a front portion with first and second ends. The outer layer further includes first and second bolster portions connected to the first and second ends, respectively, and an intermediate portion connected to the first and second bolster portions at first and second bolster seams, respectively. The the first bolster seam is configured to rupture upon deployment of the air bag. A first reinforcement panel is positioned adjacent the first bolster portion. The first reinforcement panel has a first end portion connected to the outer layer proximate the first end of the front portion, and a second end portion connected to the outer layer proximate the first bolster seam. A second reinforcement panel is positioned adjacent the intermediate portion. The second reinforcement panel has one end portion connected to the outer layer proximate the first bolster seam, and an opposite end portion connected to the outer layer proximate the second bolster seam. The reinforcement panels reinforce the outer layer during deployment of the air bag so that the air bag deploys through the first bolster seam.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 4 is an enlarged view of the first front seam showing a first reinforcement panel of the strap assembly positioned adjacent the first bolster portion of the outer layer;

FIG. 5 is an enlarged view of the first bolster seam showing a second reinforcement panel positioned adjacent the first side portion of the outer layer;

FIG. 6 is an enlarged view of the first back seam showing a first intermediate section of the second reinforcement panel connected to the outer layer proximate the first back seam;

FIG. 7 is a front perspective view of the trim cover with the reinforcement assembly shown in hidden lines; and FIG. 8 is a rear perspective view of the trim cover with the reinforcement assembly shown in hidden lines.

BEST MODES FOR CARRYING OUT THE INVENTION

Figure 1:
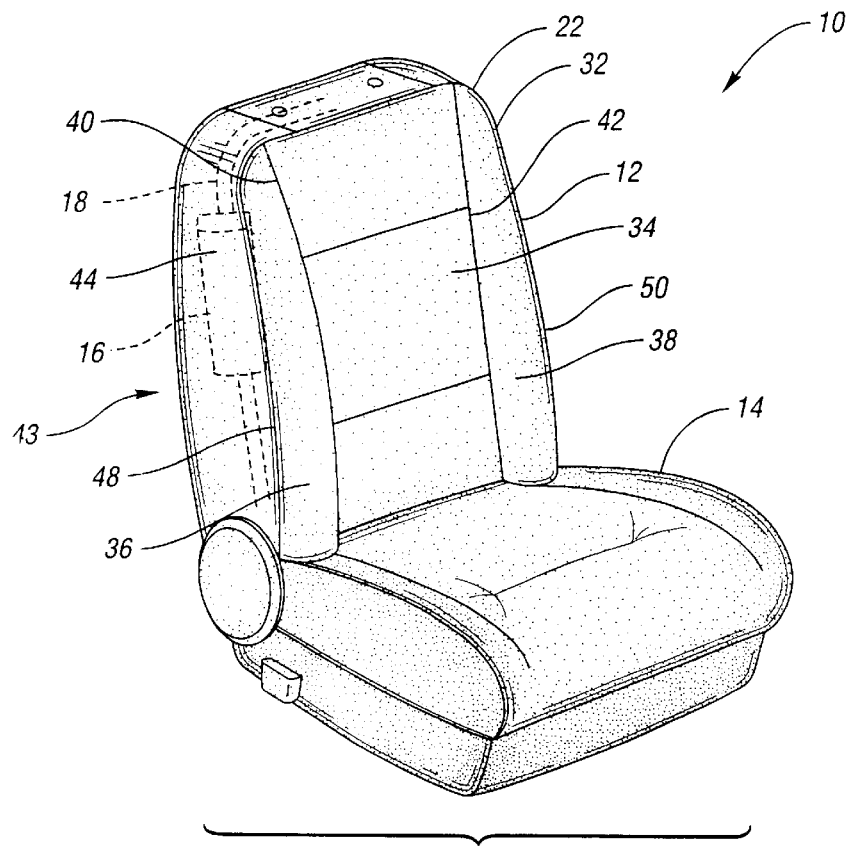
FIG. 1 is a perspective view of a vehicle seat assembly according to the invention including an air bag module connected to a frame and surrounded by a trim cover.
Figure 2:
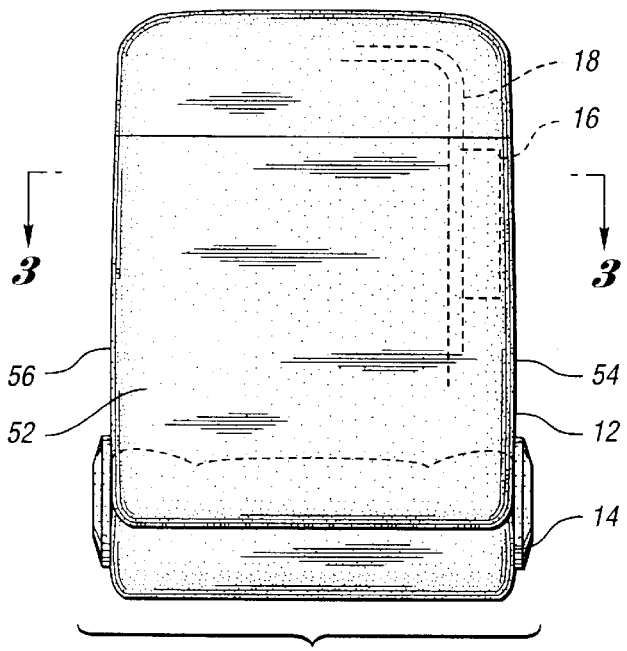
FIG. 2 is a rear view of the vehicle seat assembly shown in FIG. 1.
Figure 3:
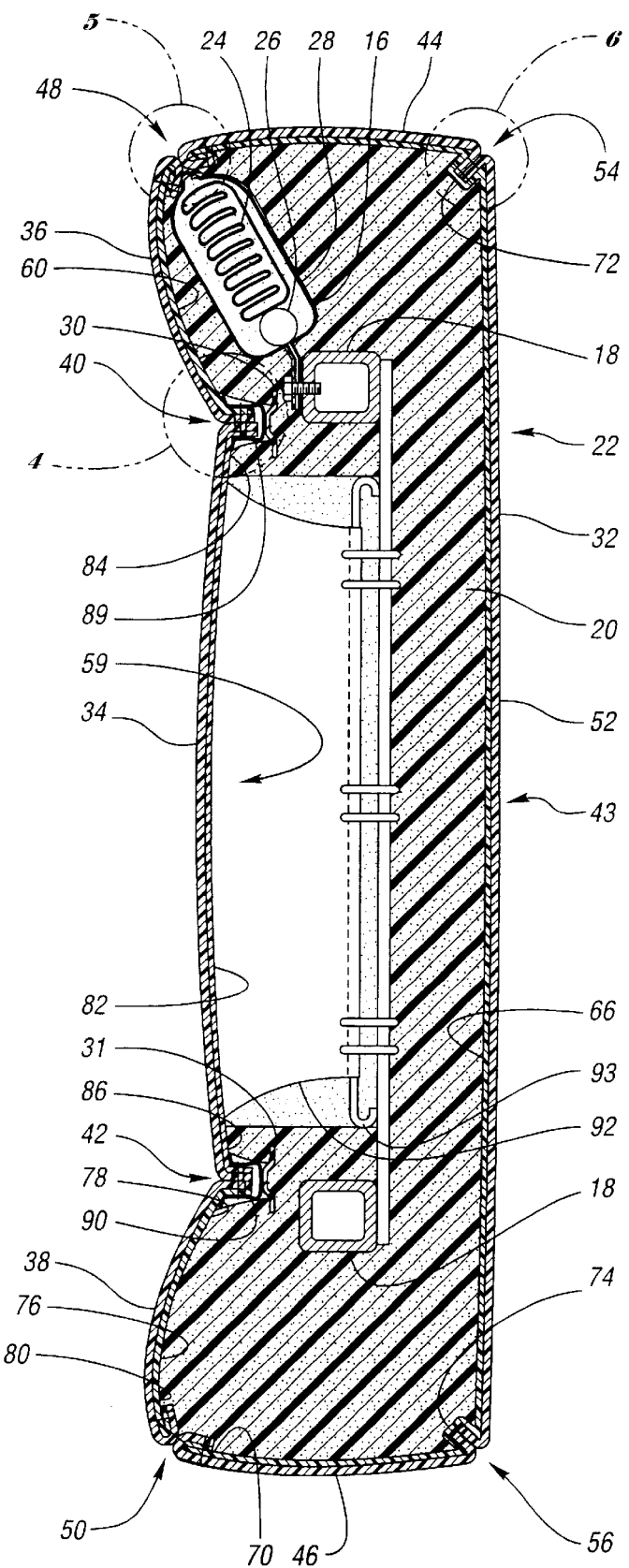
FIG. 3 is a cross-sectional view of the vehicle seat assembly taken along line 3—3 of FIG. 2 and showing the trim cover including an outer layer connected to a reinforcement assembly, the outer layer having a front portion, first and second bolster portions connected to the front portion at first and second front seams, respectively, first and second side portions connected to the first and second bolster portions, respectively, at first and second bolster seams, respectively, and a back portion connected to the first and second side portions at first and second back seams, respectively.

FIGS. 1 through 3 show a vehicle seat assembly 10 according to the invention for use with a motor vehicle. The seat assembly 10 includes a seat back 12 pivotally connected to a seat bottom 14. The seat back 12 has an air bag module 16 connected to a frame 18, and a foam pad 20 disposed about the air bag module 16 and frame 18. The seat back 12 further includes a novel seat cover or trim cover 22 surrounding the foam pad 20.

The air bag module 16 includes an inflatable air bag 24 connected to an inflator 26. A plastic clam-shell housing 28 surrounds the air bag 24 and inflator 26. The housing 28 is configured to separate at one end to release the air bag 24 upon deployment of the air bag 24. For example, the housing 28 may include quick-release clips 29 that separate upon deployment of the air bag 24. Although a portion of the foam pad 20 is shown between the air bag module 16 and the trim cover 22, this portion may be cut away, or the trim cover 22 may be disposed immediately adjacent the air bag module 16.

The foam pad 20 has first and second pad fastening elements, such as first and second pad fastening strips 30 and 31, respectively, for attaching the trim cover 22 thereto, as explained below in greater detail. For example, the pad fastening elements 30 and 31 may comprise hook portions of a hook and loop fastening system.

The trim cover 22 includes an outer layer 32 having a front portion 34 and first and second bolster portions 36 and 38, respectively, connected to the front portion 34 at first and second front seams 40 and 42, respectively. The outer layer 32 further includes an intermediate portion 43 connected to the bolster portions 36 and 38. The intermediate portion 43 preferably, but not necessarily, includes first and second side portions 44 and 46, respectively, connected to the first and second bolster portions 36 and 38, respectively, at first and second bolster seams 48 and 50, respectively. The intermediate portion 43 further includes a back portion 52 connected to the first and second side portions 44 and 46, respectively, at first and second back seams 54 and 56, respectively.

The first bolster seam 48 is configured to be rupturable in order to release the air bag 24 through the trim cover 22 upon deployment of the air bag 24. For example, the first bolster seam 48 may be sewn with a stitch row 57 that includes any suitable thread, such as pre-tensioned No. 69 thread. Furthermore, the second bolster seam 50 is also preferably rupturable so that the air bag module 16 may be mounted on either side of the frame 18. The other seams 40, 42, 54 and 56 are preferably sewn with a stitch row 58 that includes a more durable thread, such as No. 92 thread, in order to inhibit the seams 40, 42, 54 and 56 from separating during deployment of the air bag 24.

The outer layer 32 may comprise any suitable cover material such as cloth, leather and/or vinyl, or any combination of cover materials. For example, the front portion 34 may comprise cloth, while the remaining portions 36, 38, 44, 46 and 52 may comprise leather. Furthermore, the outer layer 32 may be provided with or without a padding layer.

Referring to FIGS. 3 through 8, the trim cover 22 further includes a reinforcement assembly, such as a strap assembly 59, disposed adjacent an interior surface of the outer layer 32. The strap assembly 59 is configured to reinforce the outer layer 32 so as inhibit ballooning of the outer layer 32 and/or tearing of the outer layer 32 at undesired locations during deployment of the air bag 24. Thus, the strap assembly 59 ensures that the air bag 24 deploys through a target seam, which may be the first bolster seam 48 or the second bolster seam 50 depending on the location of the air bag module 16.

The strap assembly 59 includes a first reinforcement strap or panel 60 positioned adjacent and behind the first bolster portion 36. The first reinforcement panel 60 has a first end portion 62 connected to the first bolster portion 36 proximate the first front seam 40, and an opposite second end portion 64 connected to the first bolster portion 36 proximate the first bolster seam 48. Preferably, the end portions 62 and 64 are connected to the first bolster portion 36 with a plurality of stitch rows 65.

A second reinforcement strap or panel 66 is positioned adjacent and behind the side portions 44 and 46 and the back portion 52. The second reinforcement panel 66 has a first end portion 68 connected to the first side portion 44 proximate the first bolster seam 48, and an opposite second end portion 70 connected to the second side portion 46 proximate the second bolster seam 50. Preferably, the end portions 68 and 70 are connected to the side portions 44 and 46 with stitch rows 65. Because the end portions 68 and 70 are connected to the outer layer 32 in a similar manner, only the first end portion 68 is shown in an enlarged view (FIG. 5).

The second reinforcement panel 66 also has first and second intermediate sections 72 and 74, respectively, connected to the outer layer 32 at the first and second back seams 54 and 56, respectively. Preferably, the intermediate sections 72 and 74 are connected to the outer layer 32 with stitch rows 65 such that each intermediate section 72 and 74 sandwiches or pinches a portion of the outer layer 32 at a corresponding back seam 54 and 56. Such connections may be referred to as pinch seams. Because the intermediate sections 72 and 74 are connected to the outer layer 32 in a similar manner, only the first intermediate section 72 is shown in an enlarged view (FIG. 6).

The strap assembly 59 also preferably includes a third reinforcement strap or panel 76 positioned adjacent and behind the second bolster portion 38 so that the air bag module 16 may be mounted on either side of the frame 18. The third reinforcement panel 76 has a first end portion 78 connected to the second bolster portion 38 proximate the second front seam 42, and an opposite second end portion 80 connected to the second bolster portion 38 proximate the second bolster seam 50. Because the third reinforcement panel 76 is connected to the outer layer 32 in a similar manner as the first reinforcement panel 60, enlarged views of the end portions 78 and 80 are not provided.

The strap assembly 59 may also include a fourth reinforcement strap or panel 82 positioned adjacent and behind the front portion 34 of the outer layer 32. The fourth reinforcement panel 82 has a first end portion 84 connected to the front portion 34 proximate the first front seam 40, and an opposite second end portion 86 connected to the front portion 34 proximate the second front seam 42. Preferably, the end portions 84 and 86 are connected to the front portion 34 with stitch rows 65. Furthermore, because the end portions 84 and 86 are connected to the front portion 34 in a similar manner, only the first end portion 84 is shown in an enlarged view (FIG. 4).

Top and bottom portions of the fourth reinforcement panel 82 may also be connected to the front portion 34 proximate first and second horizontal seams 87 and 88, respectively. Top and bottom portions of the reinforcement panels 60, 66 and 76, however, are preferably not connected to the outer layer 32.

Depending on the location of the air bag module 16, one of the first and third reinforcement panels 60 and 66, respectively, will likely experience the greatest amount of force during deployment of the air bag 24. Consequently, both the first and third reinforcement panels 60 and 66, respectively, preferably extend longitudinally beyond the second and fourth reinforcement panels 76 and 82, respectively, so as to provide additional reinforcement to the bolster portions 36 and 38.

The trim cover 22 further comprises first and second cover fastening elements, such as first and second cover fastening strips 89 and 90, respectively, that are engaged with the first and second pad fastening strips 30 and 31, respectively, for securing the trim cover 22 to the foam pad 20. For example, the cover fastening strips 89 and 90 may comprise loop portions of a hook and loop fastening system. The first and second cover fastening strips 89 and 90, respectively, are connected to the outer layer 32 at the first and second front seams 40 and 42, respectively, such that the first end portion 62 of the first reinforcement panel 60 is sandwiched between the outer layer 32 and the first cover fastening strip 89, and the first end portion 78 of the third reinforcement panel 76 is sandwiched between the outer layer 32 and the second cover fastening strip 90. If the strap assembly 59 includes the fourth reinforcement panel 82, the first end portion 84 is preferably sandwiched between the outer layer 32 and the first cover fastening strip 89, and the second end portion 86 is preferably sandwiched between the outer layer 32 and the second cover fastening strip 90. Preferably, the cover fastening strips 89 and 90 are connected to the outer layer 32 with stitch rows 65. With such a configuration, the cover fastening strips 89 and 90 function to further reinforce the front seams 40 and 42.

Alternatively, each of the cover fastening elements may include a vertically oriented listing pocket attached to the outer layer 32, and having a wire disposed therein. Each wire may be secured to the frame 18 in any suitable manner, such as with hog rings, interlocking wires and/or bolts and nuts.

In addition, the trim cover 22 also preferably has additional cover fastening elements for securing the trim cover 22 to the frame 18. For example, the trim cover 22 preferably includes at least one horizontally oriented listing pocket 92 having a wire 93 disposed therein. This wire may be secured to a first cross member of the frame 18 with any suitable fasteners, such as hog rings, interlocking wires and/or bolts and nuts. As another example, the trim cover 22 may include a plastic retainer 94 that snaps around a second cross member of the frame 18. Because the trim cover 22 is secured to the frame 18, loads applied to the strap assembly 59 during deployment of the air bag 24 may be transmitted to the frame 18.

Each reinforcement panel 60, 66, 76 and 82 is preferably sufficiently flexible so that the reinforcement panels 60, 66, 76 and 82 move or flex with the outer layer 32 during normal use. Each reinforcement panel 60, 66, 76 and 82 is also preferably substantially non-stretchable so that the reinforcement panels 60, 66, 76 and 82 substantially reduce or eliminate ballooning of the outer layer 32 and/or tearing of the outer layer 32 at undesired locations during deployment of the air bag 24. While the reinforcement panels 60, 66, 76 and 82 may be made of any suitable material, the reinforcement panels 60, 66, 76 and 82 preferably comprise nylon fabric. A preferred nylon material known as CODON® is available from Takata, Inc. of Auburn Hills, Mich.

Furthermore, all of the stitch rows 65 are preferably sewn with a durable thread such as No. 92 thread. Each stitch row 65 may also extend longitudinally beyond a respective reinforcement panel 60, 66, 76 and 82 so that back tack areas of each stitch row 65 are disposed outside of the respective reinforcement panel 60, 66, 76 and 82.

Because the strap assembly 59 is attached to the outer layer 32, the strap assembly 59 does not require a fastening mechanism, such as zippers or mechanical fasteners, to close the reinforcement panels 60, 66, 76 and 82 around the air bag module 16. As a result, the trim cover 22 may be preassembled and installed over the air bag module 16, frame 18 and foam pad 20 using a roller stuffer. Thus, the vehicle seat assembly 10 may be manufactured more efficiently and at significantly reduced cost compared with vehicle seat assemblies that include air bag enclosures or chutes having zippers or other mechanical fasteners.

Because both bolster seams 48 and 50 of the trim cover 22 are preferably rupturable, and because the strap assembly 59 preferably includes the third reinforcement panel 76, along with the first and second reinforcement panels 60 and 66, respectively, the trim cover 22 may be used with any suitable vehicle seat assembly having an air bag or air bag module mounted on either side. Furthermore, the trim cover 22 may also be provided with the fourth reinforcement panel 82 so as to inhibit ballooning of the front portion 34 and/or tearing of the front portion 34 during deployment of the air bag 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A trim cover for use with a vehicle seat having an air bag, the trim cover comprising:
    an outer layer including a front portion having first and second ends, the outer layer further including first and second bolster portions connected to the first and second ends, respectively, and an intermediate portion connected to the first and second bolster portions at first and second bolster seams, respectively, wherein the first bolster seam is configured to rupture upon deployment of the air bag;
    a first reinforcement panel positioned adjacent the first bolster portion, the first reinforcement panel having a first end portion connected to the outer layer proximate the first end of the front portion, and a second end portion connected to the outer layer proximate the first bolster seam; and
    a second reinforcement panel positioned adjacent the intermediate portion, the second reinforcement panel having one end portion connected to the outer layer proximate the first bolster seam, and an opposite end portion connected to the outer layer proximate the second bolster seam;
    wherein the reinforcement panels are configured to reinforce the outer layer during deployment of the air bag so that the air bag deploys through the first bolster seam.

2. The trim cover of claim 1 wherein each reinforcement panel comprises nylon.

3. The trim cover of claim 1 wherein the first reinforcement panel extends longitudinally beyond the second reinforcement panel.

4. The trim cover of claim 1 wherein the intermediate portion includes first and second side portions connected to the first and second bolster portions, respectively, at the first and second bolster seams, respectively, and a back portion connected to the first and second side portions at first and second back seams, respectively, and wherein the second reinforcement panel has first and second intermediate sections connected to the outer layer proximate the first and second back seams, respectively.

5. The trim cover of claim 1 further comprising a third reinforcement panel positioned adjacent the second bolster portion, the third reinforcement panel having a first end portion connected to the outer layer proximate the second end of the front portion, and a second end portion connected to the outer layer proximate the second bolster seam.

6. The trim cover of claim 5 wherein the second bolster seam is configured to be rupturable.

7. The trim cover of claim 5 wherein the first and second bolster portions are connected to the front portion at first and second front seams, respectively, the first end portion of the first reinforcement panel is connected to the outer layer proximate the first front seam, and the first end portion of the third reinforcement panel is connected to the outer layer proximate the second front seam.

8. The trim cover of claim 7 wherein the trim cover further comprises first and second fastening strips connected to the outer layer proximate the first and second front seams, respectively, such that the first end portion of the first reinforcement panel is sandwiched between the outer layer and the first fastening strip, and the first end portion of the third reinforcement panel is sandwiched between the outer layer and the second fastening strip, the fastening strips being engageable with the vehicle seat.

9. The trim cover of claim 7 further comprising a fourth reinforcement panel positioned adjacent the front portion of the outer layer, the fourth reinforcement panel having one end portion connected to the outer layer proximate the first front seam, and an opposite end portion connected to the outer layer proximate the second front seam.

10. A vehicle seat assembly comprising:
    a frame;
    an air bag connected to the frame; and
    a trim cover surrounding the frame and the air bag, the trim cover including:
        an outer layer including a front portion having first and second ends, the outer layer further including first and second bolster portions connected to the first and second ends, respectively, and an intermediate portion connected to the first and second bolster portions at first and second bolster seams, respectively, wherein the first bolster seam is configured to rupture upon deployment of the air bag;
        a first reinforcement panel positioned adjacent the first bolster portion, the first reinforcement panel having a first end portion connected to the outer layer proximate the first end of the front portion, and a second end portion connected to the outer layer proximate the first bolster seam; and
        a second reinforcement panel positioned adjacent the intermediate portion, the second reinforcement panel having one end portion connected to the outer layer proximate the first bolster seam, and an opposite end portion connected to the outer layer proximate the second bolster seam;
        wherein the reinforcement panels reinforce the outer layer during deployment of the air bag so that the air bag deploys through the first bolster seam.

11. The Vehicle seat assembly of claim 10 wherein the second reinforcement panel extends laterally beyond each end of the front portion.

12. The vehicle seat assembly of claim 10 wherein the second reinforcement panel extends between the bolster portions.

13. The vehicle seat assembly of claim 10 wherein the second reinforcement panel extends behind the front portion.

14. The vehicle seat assembly of claim 10 wherein each reinforcement panel comprises nylon.

15. The vehicle seat assembly of claim 10 wherein the first reinforcement panel extends longitudinally beyond the second reinforcement panel.

16. The vehicle seat assembly of claim 10 wherein the intermediate portion includes first and second side portions connected to the first and second bolster portions, respectively, at the first and second bolster seams, respectively, and a back portion connected to the first and second side portions at first and second back seams, respectively, and wherein the second reinforcement panel has first and second intermediate sections connected to the outer layer proximate the first and second back seams, respectively.

17. The vehicle seat assembly of claim 10 further comprising a third reinforcement panel positioned adjacent the second bolster portion, the third reinforcement panel having a first end portion connected to the outer layer proximate the second end of the front portion, and a second end portion connected to the outer layer proximate the second bolster seam.

18. The vehicle seat assembly of claim 17 wherein the second bolster seam is configured to be rupturable.

19. The vehicle seat assembly of claim 17 wherein the first and second bolster portions are connected to the front portion at first and second front seams, respectively, the first end portion of the first reinforcement panel is connected to the outer layer proximate the first front seam, and the first end portion of the third reinforcement panel is connected to the outer layer proximate the second front seam.

20. The vehicle seat assembly of claim 19 further comprising a foam pad surrounding the frame and the air bag and disposed underneath the trim cover, the foam pad having first and second pad fastening strips, wherein the trim cover further comprises first and second cover fastening strips connected to the outer layer proximate the first and second front seams, respectively, such that the first end portion of the first reinforcement panel is sandwiched between the outer layer and the first cover fastening strip, and the first end portion of the third reinforcement panel is sandwiched between the outer layer and the second cover fastening strip, and wherein the first and second cover fastening strips are engaged with the first and second pad fastening strips, respectively.

21. The vehicle seat assembly of claim 19 further comprising a fourth reinforcement panel positioned adjacent the front portion of the outer layer, the fourth reinforcement panel having one end portion connected to the outer layer proximate the first front seam, and an opposite end portion connected to the outer layer proximate the second front seam.

22. A vehicle seat assembly comprising:
a frame;
an air bag connected to the frame; and
a trim cover connected to the frame and surrounding the frame and the air bag, the trim cover including:
an outer layer having a front portion, first and second bolster portions connected to the front portion at first and second front seams, respectively, first and second side portions connected to the first and second bolster portions, respectively, at first and second bolster seams, respectively, and a back portion connected to the first and second side portions at first and second back seams, respectively,
wherein the first bolster seam is configured to rupture upon deployment of the air bag;
a first reinforcement panel positioned adjacent the first bolster portion, the first reinforcement panel having one end portion connected to the outer layer proximate the first front seam, and an opposite end portion connected to the outer layer proximate the first bolster seam;
a second reinforcement panel positioned adjacent the side portions and the back portion, the second reinforcement panel having one end portion connected to the outer layer proximate the first bolster seam, and an opposite end portion connected to the outer layer proximate the second bolster seam, the second reinforcement panel further having first and second intermediate sections connected to the outer layer proximate the first and second back seams, respectively; and
a third reinforcement panel positioned adjacent the second bolster portion, the third reinforcement panel having one end portion connected to the outer layer proximate the second front seam, and an opposite end portion connected to the outer layer proximate the second bolster seam.
wherein the reinforcement panels reinforce the outer layer during deployment of the air bag so that the air bag deploys through the first bolster seam.

23. The trim cover of claim 1 wherein the second reinforcement panel extends laterally beyond each end of the front portion.

24. The trim cover of claim 1 wherein the second reinforcement panel extends between the bolster portions.

25. The trim cover of claim 1 wherein the second reinforcement panel extends behind the front portion.

* * * * *